Jan. 17, 1961 G. T. LACEY 2,968,262

DECORATING APPLIANCE

Filed Aug. 18, 1958

GEORGE T. LACEY
INVENTOR
HUEBNER & WORREL
ATTORNEYS
BY Richard M. Worrel 2,968,262
Patented Jan. 17, 1961

2,968,262

DECORATING APPLIANCE

George T. Lacey, 298 Houston, Coalinga, Calif.

Filed Aug. 18, 1958, Ser. No. 755,502
3 Claims. (Cl. 107—52)

The present invention relates to a decorating appliance and more particularly to such an appliance which enables application of symbols, letters, and other decorative material to cakes and the like.

It is well-known to decorate cakes with simulated rose-buds, leaves, ribbons, and various other designs, symbols and legends. The decorating material employed is usually a semi-solid confectionery icing and generally includes coloring matter to contrast with the cake being decorated or the frosting thereof.

A popular commercial outfit for decorating cakes includes an elongated cylindrical tube having an open threaded end and an opposite closed end and is adapted to contain a quantity of decorating icing therein. A piston is longitudinally slidably fitted in the tube, and an elongated piston rod is connected to the piston and slidably extended through the closed end of the tube for reciprocating the piston. The outfit includes a plurality of frusto-conical decorating nozzles each having a base individually adapted to be threaded on the open end of the tube, and opposite tips providing orifices of various designs. With one of the nozzles connected to the tube, this outfit is employed to decorate a cake, for example, by holding the tube in one hand with the nozzle tip directed toward the surface to be decorated and by sliding the piston rod inwardly in the tube with the other hand. This forces the icing material through the nozzle and out of the orifice thereof in the desired design onto the surface of the cake.

While the described outfit is utilized quite generally by bakeries and the like it is not found in most homes and housewives generally do not have any proficiency in its use. For home use, it is the usual practice to employ a paper funnel to receive the decorating icing which is then manually extruded from the lower end of the funnel. This is a time consuming, cumbersome and untidy procedure which is aggravated by the frequent desire for a multiplicity of colors involving the formation and use of a like number of funnels.

Accordingly, it is an object of the present invention to provide an improved decorating appliance for cakes and the like.

Another object is to facilitate the application of decorative designs on cakes and pastries especially in the home where commercial applicators are not available.

Another object is to minimize time required for such decorating.

Another object is to enable handling of a decorating appliance in a more facile and convenient manner.

Another object is to enable rapid changes from one design to another in a decorating appliance.

Other objects are to provide a decorating appliance of the type described which is simple and economical to construct and use, durable and long lasting, adapted for use with various icing materials and to produce a variety of designs, and which is suited for accomplishing its intended purposes.

These, together with other objects, will become more fully apparent upon reference to the following description and accompanying drawing.

Figure 1:
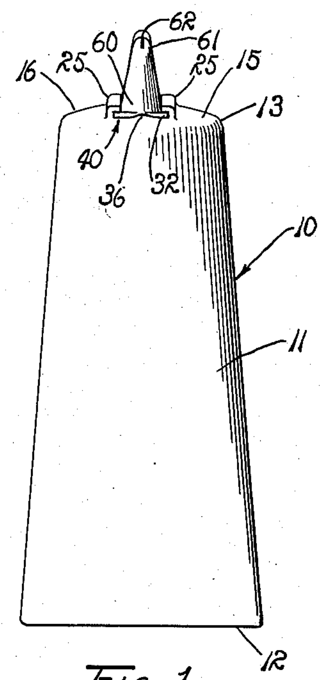
Fig. 1 is a side elevation of a decorating appliance including a flexible, compressible or squeezable tube and a decorating head embodying the principles of the present invention.
Figure 2:
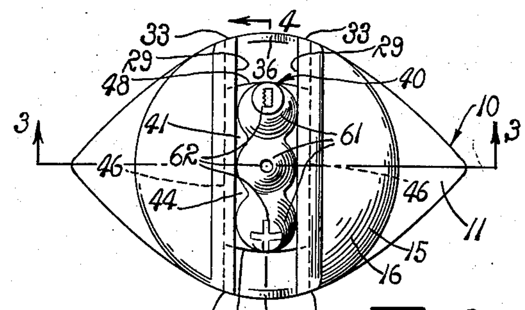
Fig. 2 is a somewhat enlarged upper end view of the appliance of Fig. 1.
Figure 3:
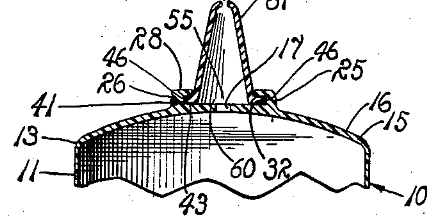
Fig. 3 is a fragmentary longitudinal section taken on line 3—3 of Fig. 2.
Figure 5:
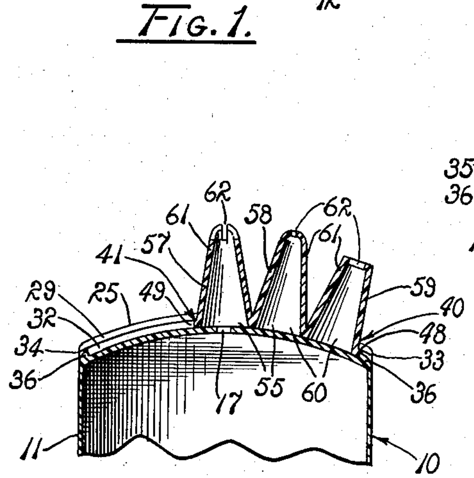
Fig. 5 is a view similar to Fig. 4 but with the decorating head in an end position.
Figure 4:
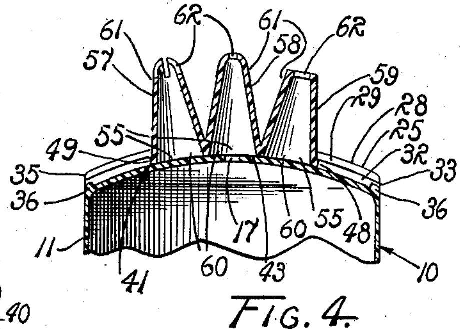
Fig. 4 is a fragmentary longitudinal section taken on line 4—4 of Fig. 2 with the decorating head in a central position.

Referring more particularly to the drawing, an elongated flexible and collapsible tube, or receptacle, of plastic or other suitable preferably disposable material is indicated by the numeral 10 and includes a generally cylindrical side wall 11 having a lower transverse seam 12 defining a closed lower end of the tube and having an upper substantially circular rim 13. The tube also includes an end wall 15 integrally connected circumferentially to the rim providing an upper convex surface 16 and a concentric aperture 17 communicating with the interior of the tube. The tube is adapted to contain a decorative icing material, not shown, and the latter is adapted to be exuded from the tube through the aperture 17 upon squeezing of the side wall of the tube. It is also to be noted that the tube is of a convenient size for holding in the hand preferably in the manner of a pencil.

A pair of elongated, transversely L-shaped resiliently flexible flanges 25, preferably of plastic, includes substantially parallel chordally extended side portions 26 integrally upstanding from the upper wall 15 of the tube 10 and laterally spaced from each other substantially equidistantly from and on opposite sides of the aperture 17 or, stated otherwise, substantially equidistantly spaced from a diametric line extended through the aperture. The flanges also have top portions 28 integrally inwardly extended toward each other from their respective side portions in upwardly spaced relation to the upper surface 16 of the upper wall 51 and terminating in parallel side edges 29 substantially equidistantly laterally spaced from, and on opposite sides of, the aperture or said diametric line. The flanges and the upper wall provide therebetween an elongated channel 32 extended diametrically of the upper wall and symmetrical about said diametric line. The flanges have opposite ends 33 and 35 sealed, or otherwise connected, to the upper wall of the tube to provide closed ends of the channel. Stops 36 extend upwardly from the end wall 15 substantially on said diametric line and at opposite ends of the channel.

A decorating head is generally indicated by the numeral 40 and is preferably made of resiliently flexible plastic. The head includes a substantially rectangular slide plate 41 longitudinally slidably fitted in the channel 32 having a bottom surface 43 slidably engaging the upper surface 16 of the upper wall 15, a top surface 44 in slidable engagement with the top portions 28 of the flanges 25, and opposite side edges 46 in slidable engagement with the side portions 26 of the flanges or, alternatively, in very closely adjacent spaced relation to said side portions. The slide plate also has opposite end edges 48 and 49 relatively adjacent to the opposite ends 33 and 35 of the channel 32. The slide plate is removable from the channel by flexing the flanges upwardly and outwardly and by lifting the side edges 46 out from under the flanges.

The slide plate 41 of the head 40 also includes a plurality of substantially circular openings 55 each larger than the aperture 17 and providing centers spaced substantially equally longitudinally of the plate and located on the longitudinal center line of the slide plate, which line is coincident with the diametrical line extended through the aperture when the plate is in the channel 32. It is also to be observed that the distance between the center of either of the outermost openings and the opposite end edge 48 or 49 of the slide plate is equal to the distance between the center of the aperture 17 and either one of the stops 36. As such, the slide plate is adapted for longitudinal slidable movement in the channel 32 between positions with the openings individually concentrically registered with the aperture 17. When one of the end edges 48 strikes its adjacent stop 36, the opening opposite to such end edge is in registration with the aperture. The other two openings are placed into registration by sliding the plate toward the opposite stop 36 in increments equal to the distance between the centers of the openings, as will be apparent.

The head 40 also includes a plurality of frusto-conical decorating nozzles 57, 58 and 59. The nozzles have circular base edges 60 of maximum diameter individually integrally connected to the plate 41 in circumscribing relation to the openings 55. The nozzles are upwardly concentrically extended from their respective openings and terminate in circular tips 61 circumscribing orifices 62 of individual designs. For example, the orifice associated with nozzle 57 is for producing a rosebud design, the orifice for nozzle 58 is used for lettering, and the orifice for nozzle 59 creates other surface ornamentation. It will be evident that by sliding the plate 41 longitudinally in the channel 32, as described above, the nozzle having the design desired can easily be selected. It is to be noted, however, that the slide plate is yieldably frictionally engaged between the flanges 25 and the upper wall 15. Although sliding of the plate 41 is permitted, it is dependably held in any position to which it is moved. This also provides an icing seal between the mating surfaces of the upper wall, the slide plate, and the flanges and insures retention of the concentric relation between the nozzle selected and the aperture 17.

*Operation*

The operation of the described embodiment is believed to be readily apparent and is briefly summarized at this point.

In order to decorate a cake, for example, and assuming the tube 10 is filled with decorative icing material, the slide plate 41 is adjusted in the channel 32 to locate the nozzle 57, 58 or 59 with the desired orifice design concentrically in registration with the aperture 17. The tube is held in a writing position in one hand with the nozzle tip 61 adjacent to the surface of the cake to be decorated. The tube is squeezed in said hand by the decorator and simultaneously moved over the surface of the cake to produce the desired design and in the desired locations on the cake.

In order to change the design being employed, the slide plate 41 is simply moved longitudinally in the channel 32 to position another of the nozzles 57, 58, or 59 over the aperture 17. This can be done quickly and simply. Again, a series of heads 40 having a wide variety of nozzle-forms integral therewith can be provided. If so, the heads can easily be changed by inserting them into or lifting them out of the channel 32.

It will be evident that the described appliance can be economically produced making it quite practical for the housewife to have a number of the tubes containing a variety of colors of icing material on hand at all times. In such event, decorations of a multiplicity of colors can quickly and easily be deposited on a cake or the like and by proper selection of the various nozzles each color can be of the extruded form desired. Normally, cake decorating material can be preserved indefinitely under refrigeration. Thus a number of differently colored and/or flavored decorating materials can be immediately available for use without any elaborate preparation for storage or use. It will be apparent that the aperture 17 is readily closed, as for storage, by positioning the slide plate 41 so as to overlay the aperture.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A cake decorating appliance comprising a receptacle adapted to contain semi-solid-cake decorating icing and having an elongated generally cylindrical side wall, a closed lower end, and an upper flexible wall circumscribed by a substantially circular rim transversely connected to the side wall, the upper wall providing an aperture concentrically thereof through which such icing is adapted to be ejected upon application of pressure against the icing and directed toward the aperture; a pair of elongated, chordally extended, resiliently flexible flanges having side portions integrally upstanding from the upper wall and laterally spaced from each other substantially equidistantly from and on opposite sides of the aperture, the flanges also having top portions inwardly extended toward each other from their respective side portions and terminating in parallel side edges substantially equidistantly laterally spaced from and on opposite sides of the aperture, the flanges and upper wall providing an elongated channel having a longitudinal center line extended substantially diametrically of the upper wall through the aperture, the flanges having opposite end edges terminating at the rim of the upper wall; stops upwardly extended from the rim of the upper wall and between the flanges; and a decorating head including an elongated flexible substantially rectangular slide plate having a width greater than the spacing between said side edges but less than the spacing between said side portions, the plate being removable from and longitudinally slidably fitted in the channel and having a plurality of openings individually adapted for registration with the aperture incident to longitudinal slidable movement of the plate in the channel, the plate being engageable with the stops to preclude removal of the head from opposite ends of the channel, the head also including a plurality of decorator nozzles having bases individually connected to the plate in individually circumscribing relation to the openings, upwardly extended from the openings, and terminating in tips circumscribing outlet orifices of individual design.

2. A decorating appliance comprising a container for flowable decorating material having an upper wall providing an aperture therein through which such material is adapted to be ejected from the container; a pair of elongated, resiliently flexible flanges having parallel side portions upstanding from the upper wall and laterally spaced from each other substantially equidistantly from and on opposite sides of the aperture, the flanges also having top portions inwardly extended toward each other from their respective side portions in upwardly spaced relation to the upper wall and terminating in parellel side edges substantially equidistantly laterally spaced from and on opposite sides of the aperture, the flanges and the upper wall providing an elongated channel having a longitudinal center line extended through the aperture, stops upwardly extended from the upper wall between the flanges and in longitudinally spaced relation to each other with respect to the channel; and a decorating head including an elongated flexible substantially rectangular slide plate having a width greater than the spacing between said side edges of the flanges but less than the spacing between said side portions of the flanges, the plate being removable from and longitudinally slidably fitted in the channel between the side portions of the flanges and between the upper wall and the top portions of the flanges, the plate having an opening adapted for registration with the aperture in the upper wall incident to longitudinal slidable movement of the plate in the channel, the plate being engageable with the stops to preclude removal of the head from opposite ends of the channel, and the head also including a decorator nozzle connected to the plate in circumscribing relation to the opening and upwardly convergently extended therefrom.

3. A cake decorating appliance comprising a container adapted to contain semi-solid decorating icing and having an upper wall circumscribed by a substantially circular rim, the upper wall providing an aperture concentrically thereof through which such icing is adapted to be ejected; a pair of elongated L-shaped flanges including substantially parallel chordally extended side portions integrally upstanding from the upper wall of the container and laterally spaced from each other substantially equidistantly from and on opposite sides of a diametrical line extended through the aperture, and top portions integrally inwardly extended from their respective side portions in upwardly spaced relation to the upper wall of the container and terminating in parallel edges substantially equidistantly laterally spaced from and on opposite sides of said diametrical line, the flanges and the upper wall providing an elongated channel having a longitudinal center line substantially coincident with said diametrical line, said channel terminating at opposite ends on the upper wall adjacent to the rim of the container; stops upwardly extended from said upper wall substantially on said diametrical line and at said ends of the channel; and a decorating head including a slide plate releasable from and longitudinally slidably fitted in the channel having opposite side edges sandwiched between the upper wall and the flanges, opposite end edges respectively adjacent to the ends of the channel and engageable with said stops to limit opposite sliding movement of the plate, and a plurality of openings larger than the aperture providing centers spaced longitudinally of the plate and lying substantially on said diametrical line, the distance between each end edge of the plate and the center of the opening at the opposite end of the plate being about equal to the distance between each stop and the aperture whereby the openings are adapted to be positioned individually and selectively concentrically of the aperture incident to longitudinal slidable movement of the plate in the channel, the head also including a plurality of decorator nozzles having bases individually integrally connected to the plate in circumscribing relation to the openings, upwardly extended from the openings, and terminating in tips providing outlet orifices.

References Cited in the file of this patent

UNITED STATES PATENTS

| | | |
|---|---|---|
| 2,070,096 | Smith | Feb. 9, 1937 |

FOREIGN PATENTS

| | | |
|---|---|---|
| 252,046 | Great Britain | May 27, 1926 |
| 553,068 | Great Britain | May 6, 1943 |